(12) United States Patent
Kraiem et al.

(10) Patent No.: US 6,925,286 B1
(45) Date of Patent: Aug. 2, 2005

(54) TRANSMIT POWER CONTROL FOR NETWORK DEVICES IN A WIRELESS NETWORK

(75) Inventors: Besma Kraiem, Fellbach (DE); Janos Enderlein, Stuttgart (DE)

(73) Assignee: Sony International (Europe) GmbH, Berlin (DE)

( * ) Notice: Subject to any disclaimer, the term of this patent is extended or adjusted under 35 U.S.C. 154(b) by 304 days.

(21) Appl. No.: 09/599,135

(22) Filed: Jun. 22, 2000

(30) Foreign Application Priority Data

Jun. 23, 1999 (EP) .......................................... 99112130

(51) Int. Cl.⁷ ............................................... H04Q 7/22
(52) U.S. Cl. ....................... 455/13.4; 455/522; 455/517
(58) Field of Search ............................... 455/13.4, 522, 455/507, 517, 418–420, 500, 68–69; 370/311

(56) References Cited

U.S. PATENT DOCUMENTS

| | | | |
|---|---|---|---|
| 5,003,619 A | | 3/1991 | Morris et al. |
| 5,822,682 A | * | 10/1998 | Schroderus et al. ........ 455/63.3 |
| 5,983,073 A | * | 11/1999 | Ditzik ........................ 455/11.1 |
| 6,055,429 A | * | 4/2000 | Lynch ......................... 455/445 |
| 6,119,010 A | * | 9/2000 | Labedz ........................ 455/446 |
| 6,178,512 B1 | * | 1/2001 | Fifield ......................... 713/201 |
| 6,298,220 B1 | * | 10/2001 | Barnhart et al. ............... 455/69 |
| 6,363,267 B1 | * | 3/2002 | Lindskog et al. ............ 455/574 |
| 6,381,230 B1 | * | 4/2002 | Wheatley et al. ............ 370/328 |

FOREIGN PATENT DOCUMENTS

| | | | | |
|---|---|---|---|---|
| EP | 0 548 939 | | 6/1993 | |
| EP | 0 579 372 | | 1/1994 | |
| WO | WO 98/23044 | * | 5/1998 | ............ H04B/7/00 |
| WO | WO 98 23044 | | 5/1998 | |
| WO | WO 9823044 | * | 5/1998 | ............ H04B/7/00 |

* cited by examiner

*Primary Examiner*—William Trost
*Assistant Examiner*—Brandon J. Miller
(74) *Attorney, Agent, or Firm*—Frommer Lawrence & Haug LLP; William S. Frommer

(57) ABSTRACT

A transmit power control applicable for direct mode in a central controller based wireless network is described whereby direct mode indicates a direct communication of two network terminals (1, 15) without routing the traffic through the central controller (18). According to the present invention the transmit power control is performed by means of exchanging messages (S1, S2, S3) between the peer network devices (1, 15) in which recommendations for power control are carried. After grant of resources (S0) by the central controller (18) for the peer mobile terminals (1, 15) to exchange such messages which neccessarily contain a recommendation to the peer neetwork device to increase/decrease its transmit power level by a certain value, a first message (S1) is send from one network device (1) to the other network device (15) which receives this message and measures its signal strength to determine the needed adjustment to set the transmit power level of the first device so that a desired received power level of the second device is achieved. This adjustment value is then transmitted in a second step (S2) as recommendation value whereafter the first device can similary recommend an adjustment of the transmit power level of the second device on basis of the message received in the second step (S2) in a third step (S3).

6 Claims, 3 Drawing Sheets

TRANSMIT POWER CONTROL FOR NETWORK DEVICES IN A WIRELESS NETWORK

The present invention relates to a transmit power control for network devices in a wireless network in particular to a transmit power control to be performed by network devices communicating in direct mode.

Figure 3:
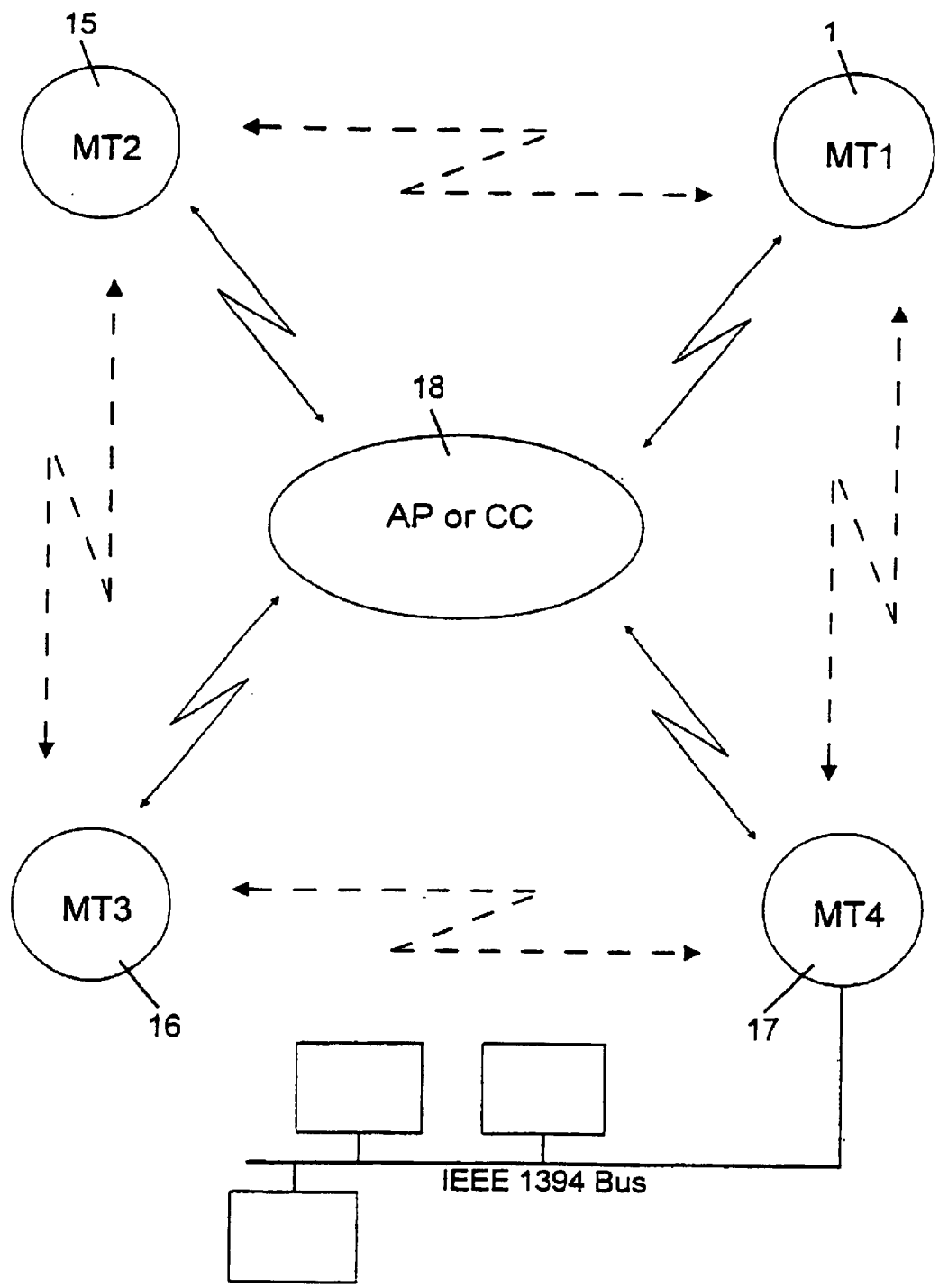

A typical wireless network, such as the IEEE 1394 based HIPERLAN type 2 broadband radio access network which specification is developed by ETSI is shown in FIG. 3. An access point or central controller 18 has an up- and downlink communication with several mobile terminals 1, 15, 16, and 17 and the mobile terminals can also have a direct communication in-between each other so that apart from the granting of resources for peer mobile terminals. e.g. the first mobile terminal 1 and the second mobile terminal 15, the access point or central controller 18 Is not Involved in the communication. Such direct communications in-between two or more mobile terminals are called direct mode. An IEEE 1394 bus with connected network devices is exemplary shown only for the fourth mobile terminal 17.

For access point based wireless networks. i.e. for up- and downlink traffic, a transmit power control method is known according to which for uplink transmit power control the access point or central controller indicates its used transmit power and its desired received power levels. Based on these values and a measurement of the received signal strength each of the mobile terminals regulates its transmit power level to achieve a constant received power at the access point or central controller 18. Thus, each of the first to fourth mobile terminals 1, 15, 16, 17 regulates its transmit power level individually Independent of the transmit power of the other mobile terminals. Furtheron, the transmit power level of the access point or central controller 18 is often chosen so that all mobile terminals 1, 15, 16, 17 have sufficient reception.

On the other hand, no transmit power control is performed in direct mode, but the mobile terminals always use a maximum transmit power level to be able to establish the maximum number of direct communications. Therefore, all the advantages of transmit power control introduced for up- and downlink traffic disappear when direct connections are set up.

Therefore, it is the object of the present invention to achieve the advantages of a transmit power control within a wireless network not only in up- and downlink mode, but also in direct mode.

To solve this object a network device according to the present invention is defined in independent claim 1 and a method to perform a transmit power control in-between two network devices of a wireless network according to the present Invention is defined in independent claim 6. Preferred embodiments thereof are respectively defined in the dependent claims.

A network device for a wireless network according to the present invention is characterized by means to adjust its transmit power on the basis-of a recommendation for the transmit power regulation received from another network device and to generate a recommendation for the transmit power regulation for another network device on basis of the signal received from said other network device.

Therefore, a network device according to the present invention enables a direct setting of the transmit power for a communication in-between peer network devices by exchanging messages in which recommendations for power control are carried.

A method to perform a transmit power control in-between a first network device and a second network device of a wireless network according to the present invention therefore comprises the steps to transmit a message from the first network device to the second network device, measuring the received signal quality within the second network device and replying to the first network device by giving a recommendation to the first network device how to adjust its power level according to the measured received signal quality and the wanted received signal quality.

Therefore, according to the inventive method, a receiving network device communicates a recommendation to the sending network device how to increase or decrease Its transmit power level. This directly leads to an adaptation of the received signal strength to the signal strength desired by the receiving device. Therefore, the receiving device itself can adjust the strength of a signal incoming from another device to its optimal signal reception point.

Preferably, a network device according to the present invention ensures that a maximum number of direct communications can be set up, since an adequate transmit power is initially used to reach the maximum number of mobile terminals.

According to the present invention, preferably the maximum transmit power level or in case that information about the link quality in-between the peer network devices is known an accordingly lower transmit power level is used as appropriate power level. The information about the radio link quality between peer network devices can either be taken from a topology map of the network that shows the radio link quality between all network devices of the network or in case a message has recently been received from the network device to which the link quality is in question, it can be based on the received signal quality of this message.

The adjustment of the transmit power of the second network device of the peer network devices is performed in the same way as the adjustment of the first network device, but the message giving a recommendation to the first network device how to adjust its power level will be used by the first network device to measure the received signal quality and to give a recommendation to the second network device how to adjust its power level.

According to a further preferred embodiment of the inventive method, a transmit power control is performed in that an adjustment of the transmit power of a network device is performed every time said device receives a recommendation to change its transmit power level. Further preferably a recommendation to change the transmit power level is given to a transmitting device whenever the received power level exceeds a maximum deviation of the wanted received signals strength. Therewith, a dynamic update of the transmit power level is achieved which does not need an excitation from outside. e.g. from the central controller.

Basically, every wireless network supporting direct mode can be adapted according to the present Invention. Preferably the present invention is used within an IEEE 1394 based HIPERLAN type 2 network. A network device according to the present invention can either be an access point/central controller or a mobile terminal.

Figure 1:
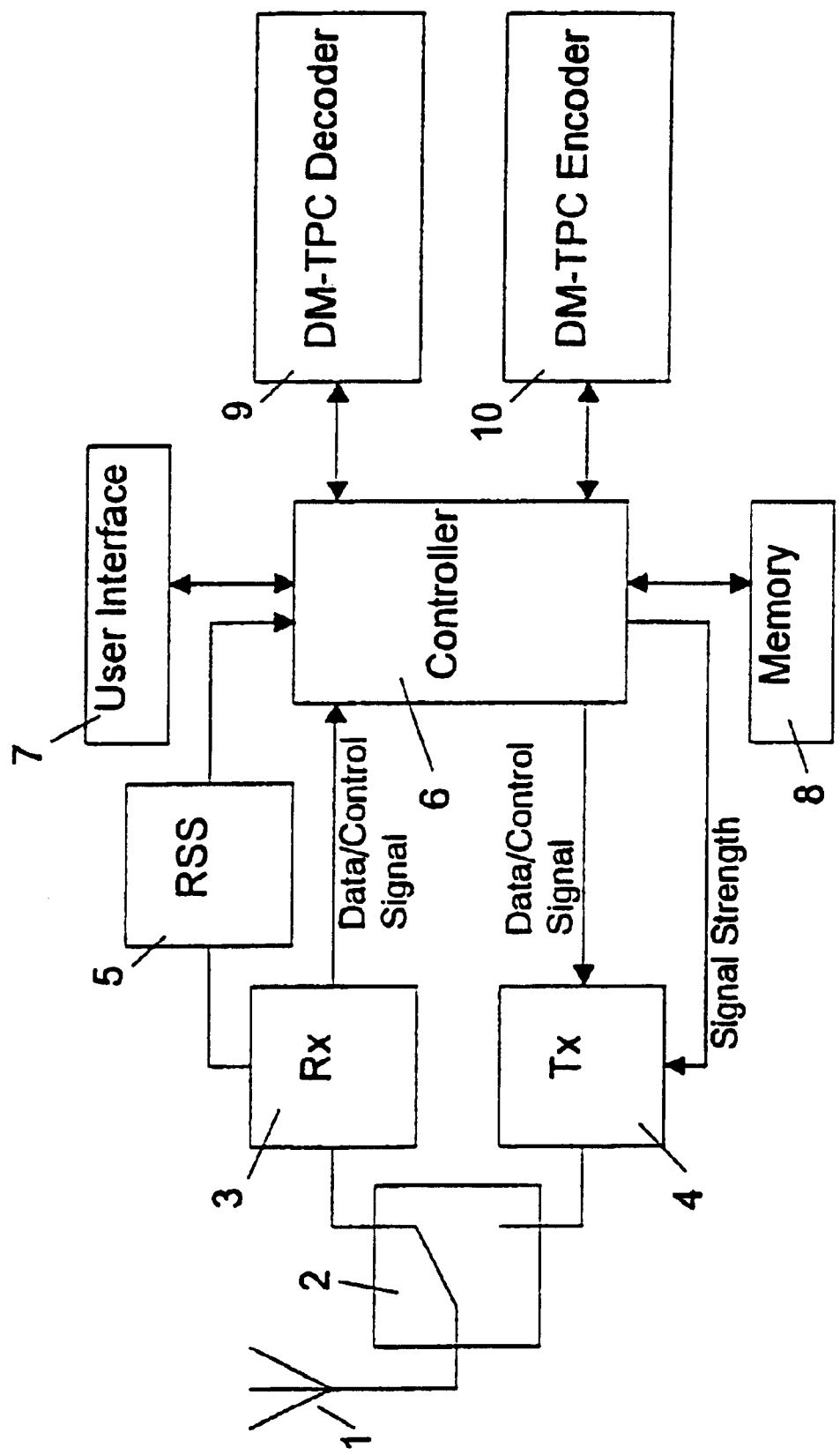
Figure 2:
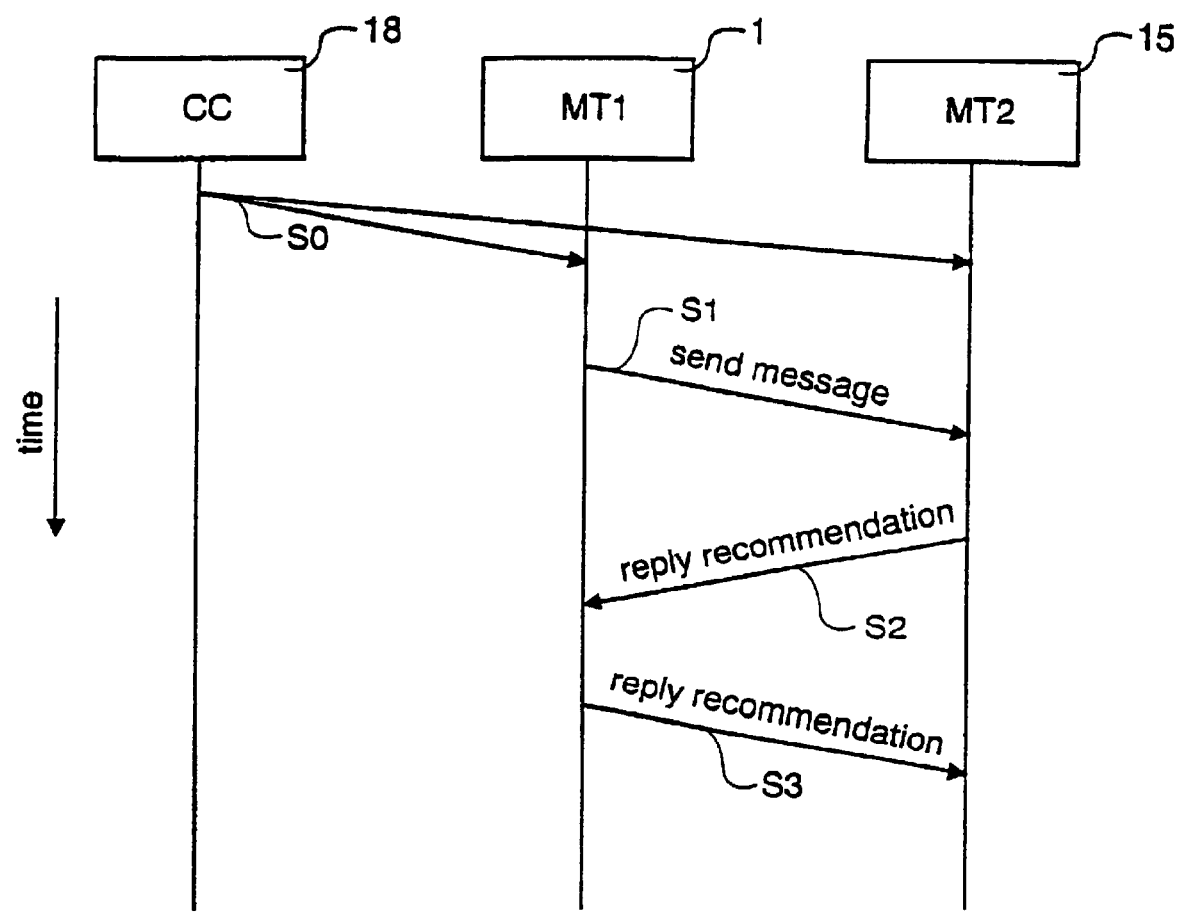

The present invention and its numerous preferred embodiments will better be understood from the following detailed description of an exemplary embodiment thereof taken in conjunction of the accompanying drawings, in which FIG. 1 shows a network device according to the present invention:

FIG. 2 shows the messaging in-between the central controller and two mobile terminals during setup of a direct mode communication and transmit power control; and FIG. 3 shows an exemplary wireless network.

The mobile terminal shown in FIG. 1 is adapted to perform a direct mode transmit power control according to the present invention. The shown mobile terminal has one antenna 1 which is connected to the movable terminal of a transmit/receive selection switch 2 which fixed terminals are respectively connected to the transmitter and receiver signal path of the mobile terminal. In the receiver signal path a receiver 3 is directly connected to the respective fixed terminal of the transmit/receive selection switch 2. This receiver 3 produces a data and control signal input to a controller 6 and also outputs a signal wherefrom a signal quality measurement unit 5 can determine the received signal strength which is output to the controller 6. For the transmitter signal path the controller 6 outputs a data and control signal to a transmitter 4 which modulates, up-converts and amplifies this signal to a given signal strength which is indicated to the transmitter 4 by a control signal generated by the controller 6 and outputs the generated transmission signal to the respective fixed terminal of the transmit/receive selection switch 2. Bi-directionally connected to the controller are a user interface 7 and a memory 8. Furtheron, the controller 6 is connected to a direct mode transmit power control decoder 9 and a direct mode transmit power control encoder 10.

The direct mode transmit power control decoder 9 receives a respective control signal from the receiving path via the controller 6 and decodes It to supply the recommendation for a change in transmit power level to the controller 6. Based on this recommendation, the controller 6 determines the signal strength needed for transmission and supplies an appropriate signal strength control signal to the transmitter 4 which then adapts its transmission power accordingly.

Based on the received signal strength determined by the signal quality measurement unit 5 which is communicated to the controller 6 and the wanted received signal strength of the receiver 3, which is known to the controller 6. a difference signal is generated within the controller 6 and supplied to the direct mode transmit power control encoder 10. Said direct mode transmit power control encoder 10 generates a control signal including a recommendation for power control and supplies it via the controller 6 as control signal to the transmitter 4. Said control signal is transmitted via the transmit/receive selection switch 2 and the antenna 1 to the peer mobile terminal adapting its transmission power accordingly in a similar way.

FIG. 2 shows a typical message flow according to a preferred embodiment of the transmit power control according to the present invention. After the connection setup in-between a first mobile terminal having the medium access control identifier. i.e. MAC-ID, MT1 and a second mobile terminal 15 having the MAC-ID MT2, a central controller 18 with MAC-ID CC grants resources for the peer mobile terminals 1 and 15 to exchange transmit power control messages. As mentioned above, those messages mainly carry a recommendation to the peer mobile terminal to increase/decrease Its transmit power level by a certain value. Furtheron, source and destination identifiers. i.e. the MAC-IDs MT1 and MT2, could be included so that the receiving mobile terminal can identify the link for which the recommendation is valid. This inclusion of the MAC-IDs is not necessary in all systems, since the receiving mobile terminal can identify the link for which the recommendation is valid on basis of the time slot in which the recommendation is transmitted. If wanted, the transmit power level of the source mobile terminal and its desired receive power level can also be included. The grant of resources for the peer mobile terminals 1 and 15 by the central controller 18 is performed in step S0.

In the following step S1 the first mobile terminal 1 sends a message to the second mobile terminal 15 comprising the information not to adjust the transmit power level and optionally both MAC-IDs as well as its own transmit power level and its desired received power level. The first mobile terminal 1 transmits this message either using the maximum transmit power level or, in case that information about the link quality to the second mobile terminal 15 is known, an accordingly lower transmit power level. As stated above, such information about the radio link quality between all mobile terminals within a network can be taken from a topology map of the network which might be created by the central controller 18 during a network calibration process.

Thereafter, the second mobile terminal 15 receives in step S2 this message, measures the received signal quality and replies to the first mobile terminal 1 by sending a message with the recommendation how to adjust the transmit power level and optionally both MAC-IDs as well as Its own transmitter power level and its desired received power level. The recommendation to the first mobile terminal 1 how to adjust its transmit power level is preferably given as a certain value. The power level of the second mobile terminal 15 is set similar to the power level of the first mobile terminal 1.

In the last step 53 the first mobile terminal MT1 transmits the message with the recommendation how the second mobile terminal 15 should amend its power level by a certain value and optionally both MAC-IDs as well as its own transmit power level and its desired received power level. This message is transmitted to the second mobile terminal 15 with the transmit power level adjusted according to the recommendation of the second mobile terminal generated and transmitted in step S2.

If time slots for the direct mode transmit power control according to the present invention are granted in each frame, three frames are required to perform the transmit power control. During this time data can be transmitted using the power level identified during calibration.

According to a further embodiment, the second mobile terminal 15 transmits its message in step S2 using an appropriate transmit power level based on the received signal quality from the first mobile terminal 1 and the desired received signal quality thereof. In this case, step S3 might be redundant and therefore skipped. However, if the first mobile terminal 1 is located in a noisy environment and requires a higher signal strength from the second mobile terminal 15, step S3 should be carried out to adjust the transmit power level of the second mobile terminal 15 accordingly.

Preferably, the transmit power level gets dynamically updated every time one of the peer mobile terminals finds it necessary. Therefore, each mobile terminal monitors the received signal quality and If a mobile terminal detects a deviation of a signal quality above a certain threshold, it notifies the peer mobile terminal to increase or decrease its transmit power level accordingly with a recommendation message according to the present invention. Preferably, the threshold level is set to the wanted power level ±3 dB.

As mentioned above, a wireless network to be adapted according to the present invention is not necessarily, but preferably an IEEE 1394 based HIPERLAN type 2 network and a network device according to the present invention is preferably a mobile terminal to introduce a transmit power control for direct mode, but according to the present invention also transmit power control in-between the mobile terminal and the central controller/access point can be performed.

To exchange the control messages which are generated according to the above exemplary embodiment by the direct mode transmit power control encoder 10 and decoded by the direct mode transmit power control decoder 9, a dedicated control channel can be used that conveys radio control protocol messages in direct mode.

What is claimed is:

1. A communication device adapted for wireless communication between the communication device and another communication device, comprising:

means for setting up direct communications in-between said communication devices in order to directly exchange messages between said communication devices, wherein said messages contain MAC (Medium Access Control) identifiers for identifying said communication devices respectively;

means for sending a request message to the other communication device in order to receive a transmit power information;

means for receiving a report message from the other communication device created in response to the request message and including an indication of a transmit power information used to transmit the report message; and means for dynamically adapting the optimal transmit power for communicating with the other communication device in accordance with the indication of the transmit power information so that the transmit power of the communication device is similar to the optimal transmit power.

2. A communication device adapted for wireless communication between the communication device and another communication device, comprising:

means for sending a request message to the other communication device in order to receive a transmit power information, wherein the request message includes identification information uniquely identifying the other communication device;

means for receiving a report message from the other communication device created in response to the request message and including identification information uniquely identifying the other communication device; and means for controlling the transmit power of the communication device on the basis of the transmit power information so that the communication device can dynamically adapt an optimal transmit power for each of a plurality of uniquely identified other communication devices.

3. A communication device adapted for wireless communication between the communication device and another communication device, comprising:

means for setting up direct communications in-between said communication devices in order to directly exchange messages between said communication devices, wherein said messages contain MAC (Medium Access Control) identifiers for identifying said communication devices respectively;

means for receiving a wireless network link information from an access point including an indication of a maximum transmit power of which the communication device is capable of transmitting in a communication channel;

means for sending a request message to the other communication device using a lower transmit power level than the maximum transmit power;

means for receiving a report message from the other communication device including an indication of a transmit power used to transmit the report message; and means for adapting the transmit power of the communication device on the basis of the indication of the transmit power.

4. A communication method for wireless communication between a communication device and another communication device, comprising:

setting up direct communications in-between said communication devices in order to directly exchange messages between said communication devices, wherein said messages contain MAC (Medium Access Control) identifiers for identifying said communication devices respectively;

sending a request message from the communication device to the other communication device in order to receive a transmit power information;

receiving at the communication device a report message from the other communication device created in response to the request message and including an indication of a transmit power information used to transmit the report message; and dynamically adapting the optimal transmit power of the communication device for communicating with the other communication device in accordance with the indication of the transmit power information so that the transmit power of the communication device is similar to the optimal transmit power.

5. A communication method for wireless communication between a communication device and another communication device, comprising:

sending a request message from the communication device to the other communication device in order to receive a transmit power information, wherein the request message includes identification information uniquely identifying the other communication device;

receiving a report message at the communication device from the other communication device created in response to the request message and including identification information uniquely identifying the other communication device; and controlling the transmit power of the communication device on the basis of the transmit power information so that the communication device can dynamically adapt an optimal transmit power for each of a plurality of uniquely identified other communication devices.

6. A communication method for wireless communication between a communication device and another communication device, comprising:

setting up direct communications in-between said communication devices in order to directly exchange messages between said communication devices, wherein said messages contain MAC (Medium Access Control) identifiers for identifying said communication devices respectively;

receiving at the communication device a wireless network link information from an access point including an indication of a maximum transmit power of which the communication device is capable of transmitting in a communication channel;

sending a request message from the communication device to the other communication device using a lower transmit power level than the maximum transmit power;

receiving at the communication device a report message from the other communication device including an indication of a transmit power used to transmit the report message; and adapting the transmit power of the communication device on the basis of the indication of the transmit power.

* * * * *